UNITED STATES PATENT OFFICE.

MATTHEW S. HOPKINS, OF READING, PENNSYLVANIA.

COMPOUND OF LIME AND SULPHUR STABILIZED WITH AN AROMATIC COMPOUND.

1,422,977.  Specification of Letters Patent.  Patented July 18, 1922.

No Drawing.  Application filed July 8, 1921. Serial No. 483,346.

*To all whom it may concern:*

Be it known that I, MATTHEW S. HOPKINS, a citizen of the United States, residing at Reading, in the county of Berks and State of Pennsylvania, have invented certain new and useful Improvements in a Compound of Lime and Sulphur Stabilized with an Aromatic Compound, of which the following is a specification.

The subject of this invention is an improved compound of lime and sulphur stabilized with an aromatic compound or compounds.

Such compounds have a wide field as insecticides and fungicides.

One of the main objects of the present invention is to produce a compound of this nature which will not decompose when in the dry state. Increased efficiency of the product is also of great importance and is one of the purposes of the present invention, as compared with known processes and their resulting products.

A well known process for producing stabilized polysulphides of calcium is to boil together lime, sulphur, and water; filter; and add a carbohydrate; and evaporate to dryness. Stick liquor (albuminous substances contained in liquid tankage) and casein have also been used in place of the carbohydrates. The product of these processes is still subject to considerable decomposition and resulting loss of efficiency. Furthermore, when produced by these well known processes, having undergone some decomposition, the compound is less soluble in water. The insoluble portion is ineffective as an insecticide and, therefore, the compound of such prior processes is, to that extent, inefficient.

The main objects of the invention are to overcome these disadvantages and produce a compound which will not decompose in the dry state and which may be manufactured equally well either under atmospheric or reduced pressure.

To that end, the lime-sulphur solution is first made in the usual and well known way, by boiling together lime, water, and sulphur. To this solution, either before or after filtering, is added from one to ten per centum, by weight (on the dry content) of soluble calcium salts of compounds of the aromatic series of hydrocarbons or aromatic compounds capable of forming soluble calcium salts, such as:—

Benzene mono and polysulphonic acids and soluble salts.

Naphthalene mono and polysulphonic acids and soluble salts.

Phenols and soluble salts.

Sulphanilic acids and soluble salts.

Naphthionic acids and soluble salts.

Quercitron and other wood extracts.

The resulting solution is then evaporated to dryness either under atmospheric pressure or in vacuo. The resulting product is more stable and more soluble in water and, therefore, more efficient as a spray ingredient for insects and fungi. As an insecticide or fungicide it is used and applied in any of the usual and well known ways.

Having thus described my invention, what I claim as new and desire to protect by Letters Patent is:—

1. A composition of matter including a calcium polysulphide and a calcium salt of an aromatic sulphonic acid.

2. A composition of matter including a calcium polysulphide and a calcium salt of naphthalene sulphonic acid.

3. A lime-sulphur compound including in its content more than one percentum and less than ten percentum of a calcium salt of an aromatic sulphonic acid.

MATTHEW S. HOPKINS.